(12) United States Patent
Ritz (10) Patent No.: US 6,742,180 B1
(45) Date of Patent: May 25, 2004

(54) SYSTEM AND METHOD PROVIDING SEAMLESS TRANSITION OF OPERATING SYSTEM ENVIRONMENT

(75) Inventor: Andrew J. Ritz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 09/699,801

(22) Filed: Oct. 30, 2000

(51) Int. Cl.$^7$ ................................................ G06F 9/45
(52) U.S. Cl. ....................................................... 717/174
(58) Field of Search ................................ 717/168, 174; 713/2

(56) References Cited

U.S. PATENT DOCUMENTS

| | | | | |
|---|---|---|---|---|
| 4,456,954 A | * | 6/1984 | Bullions et al. | 711/207 |
| 5,361,358 A | * | 11/1994 | Cox et al. | 717/174 |
| 5,764,984 A | * | 6/1998 | Loucks | 719/319 |
| 5,887,163 A | * | 3/1999 | Nguyen et al. | 713/2 |
| 6,269,409 B1 | * | 7/2001 | Solomon | 719/329 |
| 6,269,480 B1 | * | 7/2001 | Curtis | 717/106 |
| 6,324,062 B1 | * | 11/2001 | Treiber et al. | 361/727 |
| 6,332,219 B1 | * | 12/2001 | Curtis et al. | 717/170 |
| 6,351,850 B1 | * | 2/2002 | van Gilluwe et al. | 717/175 |
| 6,374,401 B1 | * | 4/2002 | Curtis | 717/175 |

OTHER PUBLICATIONS

Kahn et al., Imax: A Multiprocessor Operating System for an Object Oriented Compiler, 1981, ACM, p. 127–136.*

Lampson et al., An Open Operating System for a Single User Machine, 1979, ACM, p. 98–105.*

Moore, Sonia Marie et al., "Microsoft Windows NT Workstation 4.0 Resource Guide", Microsoft Corporation, © 1995., pp. 1–67. Available online at http://www.microsoft.com/technet/.*

"Microsoft Knowledge Base Article #141377: Differences Between Regedit.exe and Regedt32.exe", Microsoft Corporation, © unknown, pp. 1–3. Available online at http://support.microsoft.com/.*

Daily, Sean, "Introducing Windows NT 4.0", 29$^{th}$ Street Press, © 1997, pp. 1–9. Available online at http://books24x7.com.*

Budenske, J.R., et al.; "On-Line Use of Off-Line Derived Mappings for Iterative Automatic Target Recognition Tasks and a Particular Class of Hardware Platforms", *Proceedings, Sixth Heterogeneous Computing Workshop*, 1997, p. 96–110.

Ranville, S., et al., "Automating Software Specification, Design and Synthesis for computer Aided Control System Design Tools", *IEEE 19th Digital Avionics Systems Conference*, vol. 1, 2000, p. 4.C.3–1–4.C.3–11.

* cited by examiner

Primary Examiner—John Chavis
(74) Attorney, Agent, or Firm—Amin & Turocy, LLP (57) ABSTRACT

A system is provided for installing an N-bit operating system (OS), which includes an M-bit OS. The system includes a mapping subsystem for creating a file which includes components corresponding to the N-bit OS, and components corresponding to the M-bit OS, and an installation subsystem for installing the respective components so that either an N-bit or M-bit application can be executed. The mapping subsystem processes a singular list of files associated with the N-bit OS to create the M-bit OS to facilitate efficient management and tracking between the N-bit OS and the M-bit OS.

30 Claims, 6 Drawing Sheets

SYSTEM AND METHOD PROVIDING SEAMLESS TRANSITION OF OPERATING SYSTEM ENVIRONMENT

TECHNICAL FIELD

The present invention relates generally to computer systems, and more particularly to a system and method for enabling a smooth transition from a first operating system environment to a second operating system environment wherein files associated with each operating system environment are generated from a single source and installed on a target computer system.

BACKGROUND OF THE INVENTION

Computer systems have forever changed modern society and industry. In recent times, technological changes and innovations relating to computers occur on almost a daily basis. Many of these changes are related to ever more sophisticated computing architectures and designs. For example, in the not too distant past, 8 and 16 bit computing architectures were common-place. As a result, operating systems and associated applications were often times optimized to work within these computing architectures. As microprocessors have evolved, however, 32 bit and 64 bit architectures have replaced the 8 and 16 bit systems resulting in increased performance and productivity. As hardware architectures change, operating system software and related applications are often modified and/or completely re-written in order to adapt to new hardware platforms. Moreover, operating system software platforms are often maintained in duplicate as hardware platforms transition from one design to the next.

As an example of duplicate software platform maintenance, a team of software developers may maintain two or more versions of software relating to multiple hardware platforms. For example, a 32 bit operating system may be maintained via a first set of associated files and a 64 bit operating system may be maintained via a second set of files. It may be desirable however, to have both versions of the operating system track one another during the transition period. For example, if a feature is removed from the 64 bit operating system, it is likely that the feature should also be removed from the 32 bit operating system. Thus, files must be removed from both versions, each operating system must be rebuilt under both versions, and new directories maintained in duplicate to support both operating systems. Consequently, much time and energy is required to maintain both systems. Furthermore, errors are likely to occur since both systems are usually built independently of one another by various developers. Thus, tracking problems between the two operating systems are likely to occur causing unwanted divergence between the two systems.

In view of the above problems associated with conventional operating systems, there is an unsolved need for a system and/or methodology to facilitate migration from a first operating system environment to one or more other environments.

SUMMARY OF THE INVENTION

The present invention relates to seamless operating system migration from a first execution environment to at least a second execution environment. A system and method are provided wherein a plurality of operating systems may be generated and installed on a target computer system. This may be achieved, for example, by processing a singular source list associated with a first operating system via a mapping and installation system. This enables newer applications to operate with the first operating system and enables previously written/debugged applications to operate with the second operating system—all on the same target computer system, if desired. The first operating system (OS) may be associated with an N-bit OS (e.g., 64 bit OS), and the second operating system associated with an M-bit OS (e.g., 32 bit OS), for example. It is to be appreciated that a plurality of operating systems may be built and installed via the mapping and installation system of the present invention.

The mapping system of the present invention enables files associated with the first and second operating systems to be maintained and generated from a singular list of files associated with the first operating system. In this manner, changes applicable to each respective operating system are efficiently managed, maintained and tracked. The installation system relates to installing the N-bit and M-bit operating systems on the target system. For example, a 32 bit OS and a 64 bit OS, may each be installed on a target computer system, wherein 32 bit applications operate with the 32 bit OS and 64 bit applications operate with the 64 bit OS. If a file were to be added/removed to/from each OS, for example, the present invention enables the addition/removal of the file from the 32 bit OS and the 64 bit OS, respectively, via the mapping and installation system. This mitigates managing and changing two separate lists associated with each OS as with conventional systems.

More particularly, the present invention provides a mapping system to determine and generate a combined list of files associated with the first and second operating systems. The list of files may be determined from a single list of files associated with one of the operating systems. A filter is provided to read the single list of files and generate a combined list of build and installation directives for the respective operating systems, wherein the combined directives are employed to build and install each respective OS on a single target computer system, if desired. For example, the filter may automatically generate a list of 32 bit files from a known list of 64 bit files. The files are then built and directed to isolated portions of a compact disc (CD) via identifiers associated with the files. An installation system of the present invention is provided to load the files from the isolated portions of the CD to respective execution portions within the target computer system. In this manner, files may be maintained in a single place and easily maintained and/or upgraded as necessary.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout.

The present invention relates to a system and methodology to facilitate operating system file generation and installation from a single source. A singular list is processed to provide build and installation directives to enable generation and installation of an N-bit and an M-bit operating system (OS). File lists associated with the N-bit OS may be processed to determine a second list of files for the M-bit OS wherein the N-bit files and the second list of M-bit files are subsequently combined into a build directives file and an installation directives file. The build directives are utilized to generate N-bit and M-bit binary files, and the installation directives provide instructions wherein the binary files are to be installed in a target computer system. The N-bit OS and M-bit OS binaries may then be processed into a CD along with the installation directives. The CD may be input to the target computer system wherein the installation directives facilitate installation of the N-bit and M-bit operating systems, respectively. By generating build and installation files for the respective operating systems from a singular list, tracking, maintenance and efficiency as related to managing a plurality of operating systems is improved over conventional systems.

Figure 1:
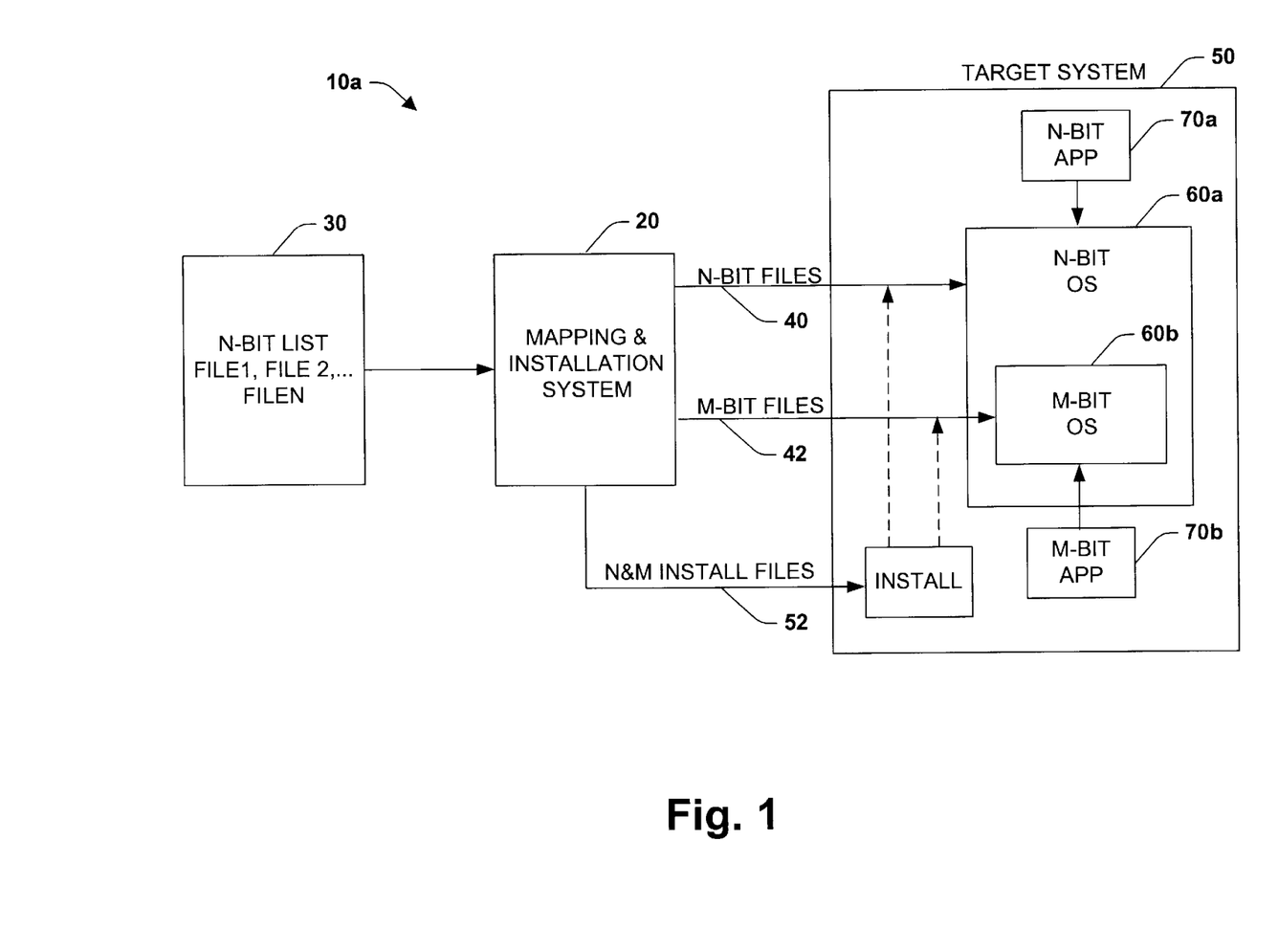
FIG. 1 is a schematic block diagram illustrating a mapping and installation system in accordance with an aspect of the present invention.

Referring initially to FIG. 1, an exemplary system 10a illustrates an aspect of a mapping and installation (MI) system 20 in accordance with the present invention. The MI system 20 processes a singular list 30 of related files and registry settings associated with an N-bit OS (e.g., 8 bit, 16 bit, 32 bit, 64 bit, etc.) and generates N-bit binary files 40 and M-bit binary files 42 associated with an M-bit OS (e.g., 8 bit 16 bit, 32 bit, 64 bit, etc.) that are to be installed on a target system 50. A combined list of installation files 52 that includes installation directives relating to the N-bit binaries 40 and the M-bit binaries 42 are also generated by the MI system 20 to enable installation of the binary files on the target system 50. The target system 50 which may be one or more computer systems, includes both an N-bit operating system 60a and an M-bit operating system 60b after installation of the binary files 40 and 42. It is to be appreciated that a plurality of additional operating systems (not shown) may also be generated and installed in the target system 50 in accordance with the present invention.

After installation of the N-bit OS 60a and M-bit OS 60b, N and M-bit applications 70a and 70b may then execute with each respective OS 60a and 60b. For example, the N-bit application 70a may execute by interacting (e.g., invoking related functions, objects, executables, DLL's) within the N-bit OS 60a. Likewise, the M-bit application 70b may execute by interacting within the M-bit OS 60b. In this manner, newer N-bit applications 70a may be written to exploit advanced features (e.g., faster clock speeds, larger data/address buses) within the target system 50, wherein the M-bit applications 70b may execute with a previously designed and debugged M-bit OS 60b. For example, the N-bit application 70a may be a 64 bit application program designed to execute on a 64 bit N-bit OS 60a whereas the M-bit application 70b may be a previously written and debugged 32 bit application designed to execute on a 32 bit M-bit OS 60b. This enables developers to migrate lower performance (e.g., 32 bit vs. 64 bit) applications 70b to the target system 50 with a relatively low debug and development cost.

As will be described in more detail below, the MI system 20 mitigates management, maintenance and tracking problems associated with conventional systems. This is achieved by mapping the singular N-bit list 30 of associated files and registry settings into separate N-bit files 40, M-bit files 42 and installation files 52. By maintaining a singular list 40 and generating/installing files associated with both the N-bit OS 60a and M-bit OS 60b, additions/removals to each respective OS are facilitated over conventional systems. For example, if a new file (not shown) were added to the N-bit list 30, the MI system 20 may generate a corresponding directive to build the new file for both the N-bit OS 60a and the M-bit OS 60b. The MI system 20 may also generate installation directives to install the new file in each operating system 60a and 60b. In this manner, essentially a singular list 30 is maintained and both operating systems 60a and 60b may track one another. Thus, painstaking and bothersome management of separate operating systems is mitigated over conventional systems.

Figure 2:
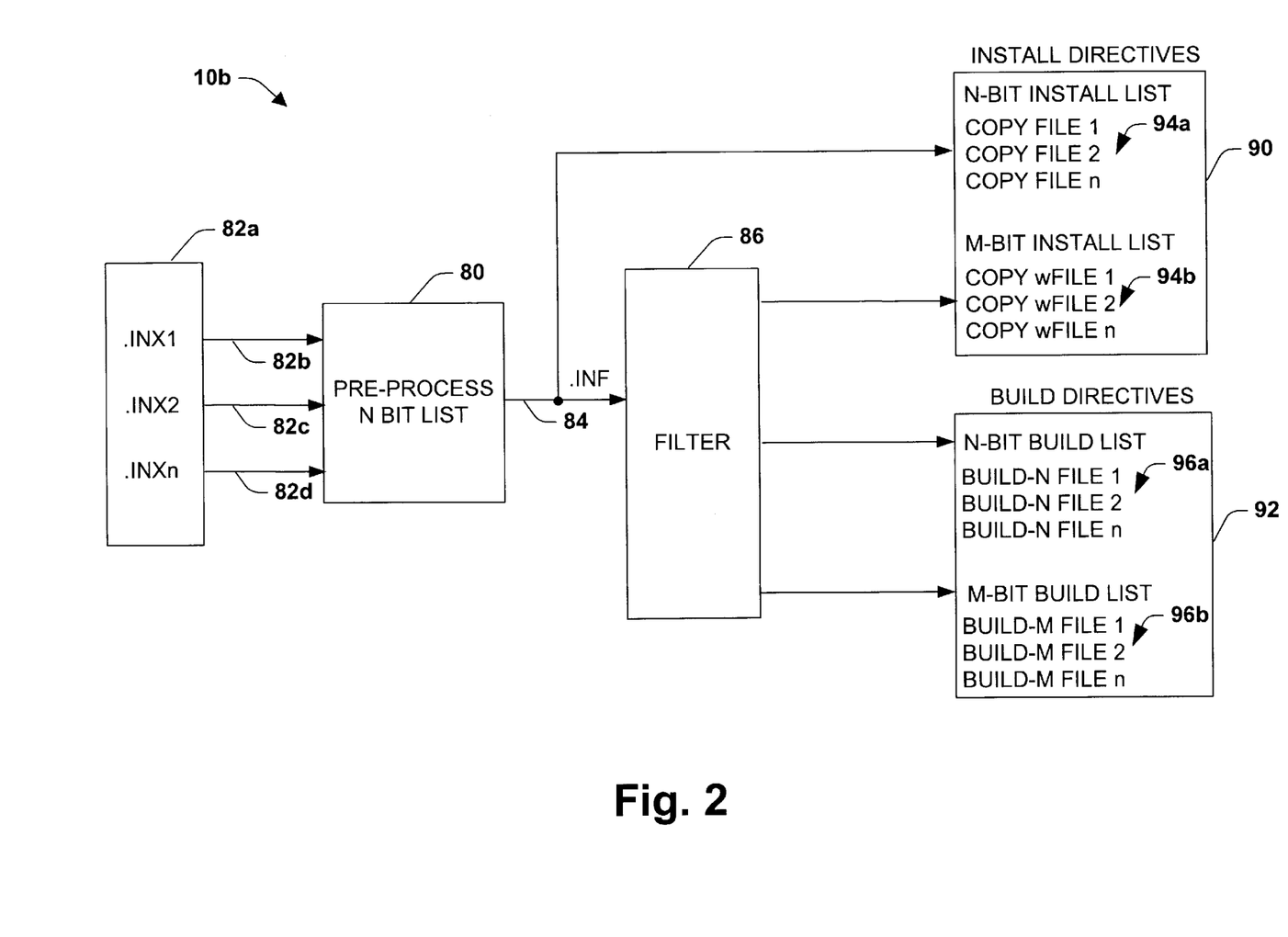
FIG. 2 is a schematic block diagram illustrating a mapping system in accordance with an aspect of the present invention.

Referring now to FIG. 2, a mapping system 10b is illustrated in accordance with an aspect of the present invention, wherein a singular list relating to a first operating system is employed to generate installation and build directives relating to a plurality of operating systems. A preprocessor 80 is provided to process an N-bit list 82a of intermediate files (e.g., INX files) associated with a first operating system. The list 82a may include operating system files 82b, settings files 82c and other files 82d that are designated for installation on the target system. These files may include listings of programs, directories, binaries, text and registry settings associated with the installation of the first operating system on the target system. The preprocessor 80 reads and processes all of the files in the N-bit list 82a and outputs a list of N-bit install directives 84 to a filter 86 and to a combined installation directives file 90. The install directives 84 may be in the form of copy commands to direct the target system where to install files associated with the N-bit operating system. For example, the preprocessor 80 may read an intermediate operating system file 82b such as Layout.INX that describes files to be installed on the target system. A settings file 82c such as Syssetup.INX may also be read which describes various registry and computer settings on the target system. After inputting the files 82b–82d, the preprocessor 80 may generate install directives 84 by associating file copy and setup commands with the input files 82b–82d. The commands may be utilized by the target system to install the operating system. After preprocessing the INX files, the install directives 84 may be formatted as Layout.INF and Syssetup.INF, for example. Although files 82b and 82c are described for exemplary purposes, it is to be appreciated that other N-bit operating system files 82d may be read and processed by the preprocessor 80.

The filter 86 reads the install directives 84 and generates the combined N-bit and M-bit installation directives file 90 and also generates a combined N-bit and M-bit build directives file 92. As will be described in more detail below, the combined installation directives 90 are employed to direct the target system to install binary files associated with the N and M bit operating systems, respectively, wherein the build directives 92 are employed to generate the binary files. The build directives 92 enable binary files to be built and directed to respective directories associated with each operating system. The respective directories and the combined installation directives 90 are then provided to isolated portions of the CD installation disk. When a user installs the CD, the installation directives 90 are utilized to install the N-bit OS and the M-bit OS into respective execution portions on the target computer system.

The installation directives file 90 includes a listing of N-bit directives 94*a* associated with the preprocessor output 84 and a listing of M-bit directives 94*b* via the filter 86. The filter 86 generates the M-bit list 94*b* by appending a letter and/or other symbol/character (e.g. a, b, c, w, ?, !, &) to a buffered copy of all N-bit files 94*a* and writing the copy to the combined installation directives file 90. By appending a character, an install file (e.g, Setup.exe) may distinguish between the N-bit installation directives 94*a* and the M-bit installation directives 94*b* at installation time. Since the install files may be distinguished by filename, a search algorithm may utilize the filename as input and distinguish between N-bit OS versions and M-bit OS versions, respectively. As will be described in more detail below, the install file is employed on the target system to install the N and M-bit operating systems via the directives 94*a* and 94*b*.

The combined list of build directives 92 may also be provided by the filter 86, wherein build commands 96a and 96b are generated to enable builds of a combined list of binary files that are described in more detail below. The build commands 96*a* and 96*b* may be generated by associating the preprocessor output 84 with build instructions. For example, an exemplary build instruction may include a compile and link operation. It is to be appreciated that other build instructions may be employed. As an example, a file such as "foo.dll" may be output from the preprocessor 80 as a listing of a desired binary file to install on a target system. The filter 86 may output a plurality of build command strings to the build directives file 92, wherein the strings may have an exemplary N-bit command format such as compile64 foo.c++, link64 foo.co to provide a portion of the list 96*a*. Similarly, an M-bit command format such as compile32 foo.c++, link32 foo.co may be generated to provide a portion of the list 96*b*. In this manner, the root name "foo" which is derived from the preprocessor output 84 may be employed to generate the build directives 96*a* and 96*b*.

Figure 3:
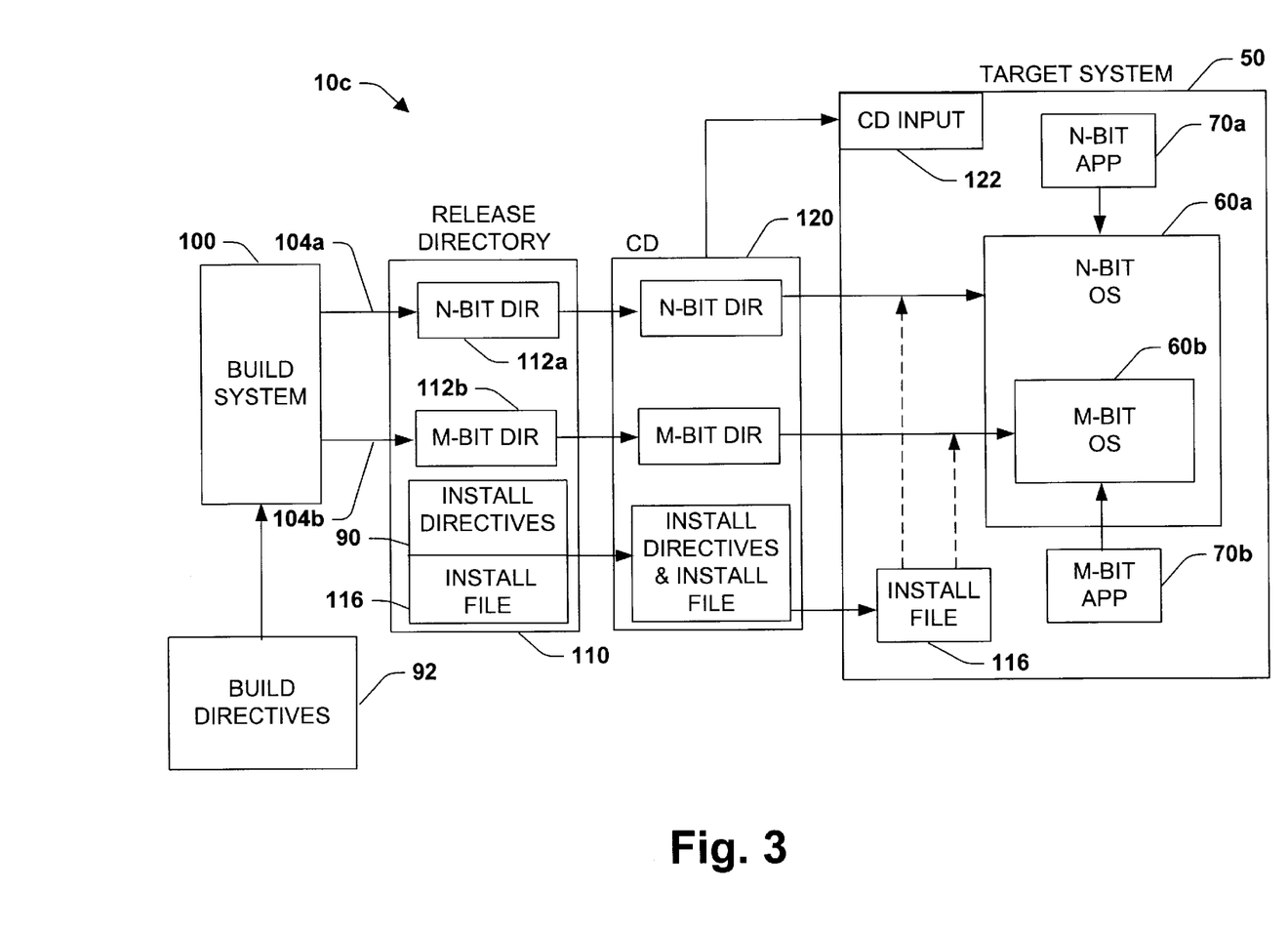
FIG. 3 is a schematic block diagram illustrating an installation system in accordance with an aspect of the present invention.

Turning now to FIG. 3, an installation system 10*c* illustrates another aspect of the present invention relating to installing the N-bit and M-bit operating systems 60*a* and 60*b* on the target system 50. The build directives 92 are input to a build system 100 for creating binary files for the N and M bit operating systems 60*a* and 60*b*. The build system 100 may include a plurality of compilers, linkers, formatters and/or other tools as are well understood to process the build directives file 92 and generate N and M-bit binary files 104*a* and 104*b*. A release directory 110 may be provided to store the binary files 104*a* and 104*b* in an N-bit subdirectory 112*a* and an M-bit subdirectory 112*b*. After the M-bit files 104*b* are generated, a letter such as "w" and/or other code may be appended to files in the M-bit subdirectory in order to correlate with the installation directives 94*b*, described above. The installation directives file 90 and an install file 116 may also be included in the release directory 110. After the build system 100 has completed processing, a CD 120 and/or other storage media may be employed to transfer the contents of the release directory 110 to the target system 50.

After the CD is impressed with the contents of the release directory 110, the CD 120 may then be input at a target system input 122. The install file 116, such as setup.exe for example, may be initiated by the target system 50 automatically upon installation of the CD 120 as is well understood. The install file 116 utilizes the installation directives file 90 to direct target system installation of the binary files 104*a* and 104*b* associated with the N-bit and M-bit operating systems 60*a* and 60*b*, respectively. As the M-bit files are installed on the target system 50, the appended letters/codes associated with the M-bit binary files 104*b* may be removed by the install file 116. As described above, applications 70*a* and 70*b* may then invoke the respective operating systems 60*a* and 60*b*, as necessary.

Figure 4:
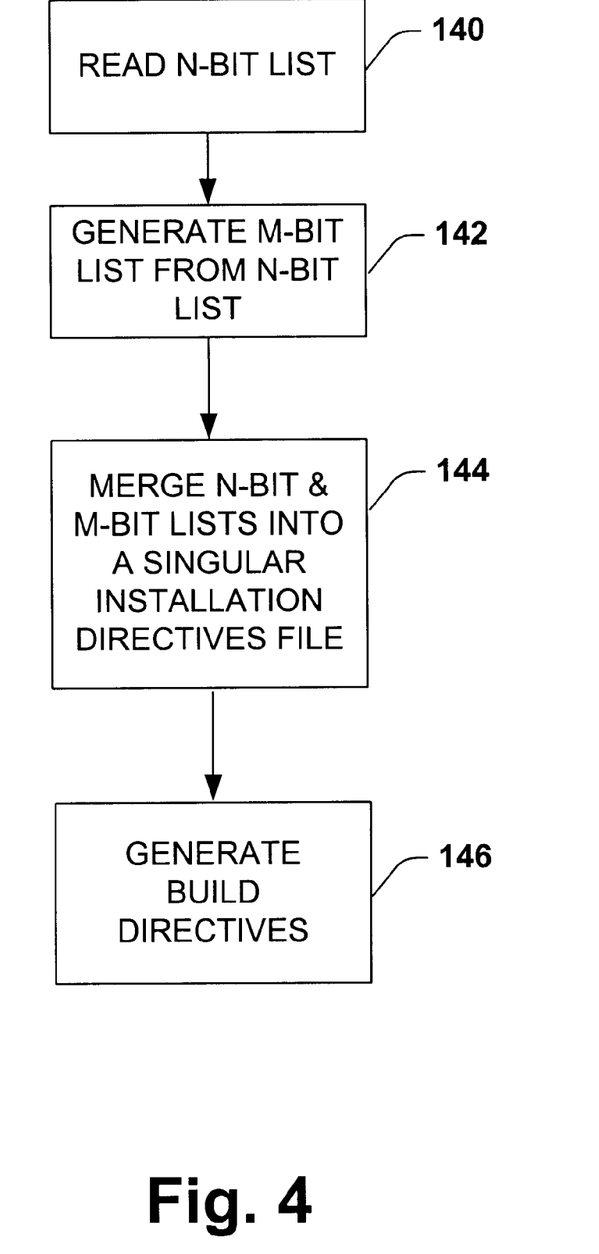
FIG. 4 is a flow chart diagram illustrating a methodology for providing a mapping system in accordance with an aspect of the present invention.
Figure 5:
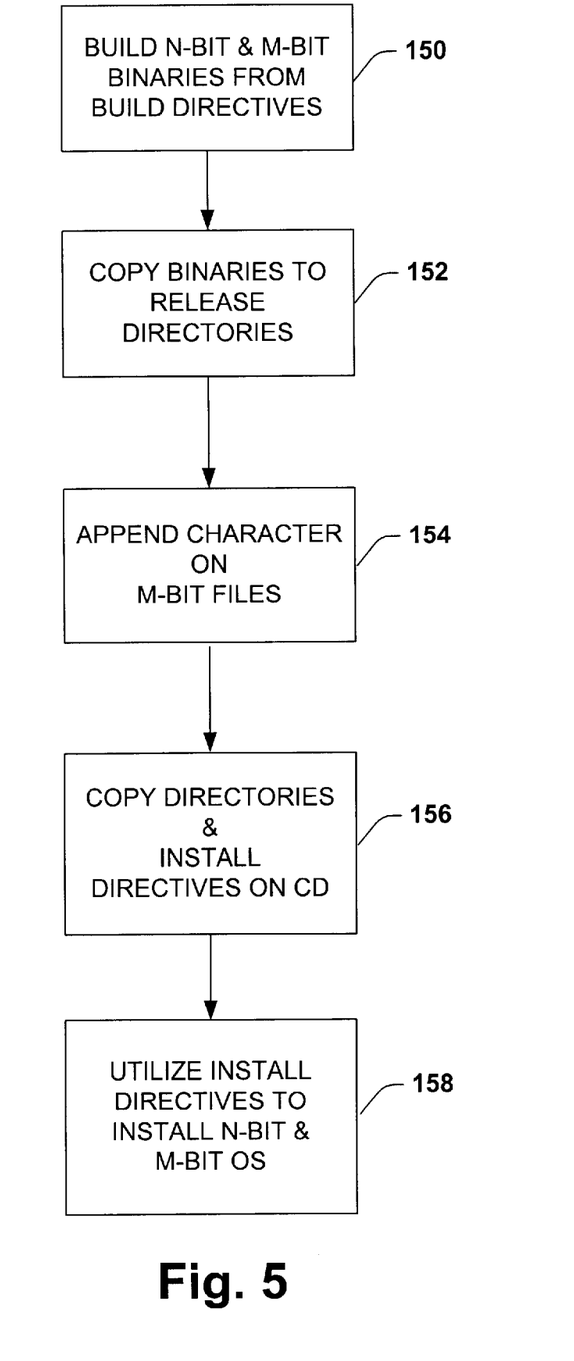
FIG. 5 is a flow chart diagram illustrating a methodology for providing an installation system in accordance with an aspect of the present invention.

FIGS. 4 and 5 illustrate a methodology for providing a mapping and installation system in accordance with an aspect of the present invention. While, for purposes of simplicity of explanation, the methodology is shown and described as a series of steps, it is to be understood and appreciated that the present invention is not limited by the order of steps, as some steps may, in accordance with the present invention, occur in different orders and/or concurrently with other steps from that shown and described herein. For example, those skilled in the art will understand and appreciate that a methodology could alternatively be represented as a series of interrelated states, such as in a state diagram. Moreover, not all illustrated steps may be required to implement a methodology in accordance with an aspect the present invention.

Referring to FIG. 4, a flow chart diagram illustrates a methodology for providing a mapping system in accordance with an aspect of the present invention. At step 140, an N-bit list of files associated with an N-bit operating system is read to determine files for generating an M-bit list of files for an M-bit operating system. At step 142, an M-bit installation list is generated from the N-bit list of files read at step 140. As described above, the M-bit list may have an attached character/symbol or other code associated with each file in the list to enable an installation file to distinguish between the N and M-bit installation directives. At step 144, the N and M-bit installation lists are combined into a singular installation directives file that provides directions (e.g., copy instructions) to a target computer system on how to install the N and M-bit operating systems. At step 146, a combined build directives file is generated as described above to enable a build system to generate binary files associated with the N and M-bit operating systems.

Referring now to FIG. 5, a flow chart diagram illustrates a methodology for providing an installation system in accordance with an aspect of the present invention. At step 150, N and M-bit binary files are built via the directives generated in step 146 above. At step 152, the binary files generated in step 150 are copied to release directories associated with the N and M-bit binary files respectively. The installation directives generated at step 144 above may also be copied to the release directory. At step 154, characters/symbols and/or other codes may be appended to the M-bit files in the release directories in order to correlate with the installation directives generated at step 142 above. At step 156, the release directories are processed onto a CD and/or other storage media. At step 158, the installation directives that were processed onto the CD are utilized to install the N and M-bit binary files, respectively. As described above, an installation file, such as Setup.exe, may be employed to read the installation directives and install the N and M-bit binary files. Also, the character appended to the M-bit binary files in step 154 may be removed from the M-bit files during installation.

Figure 6:
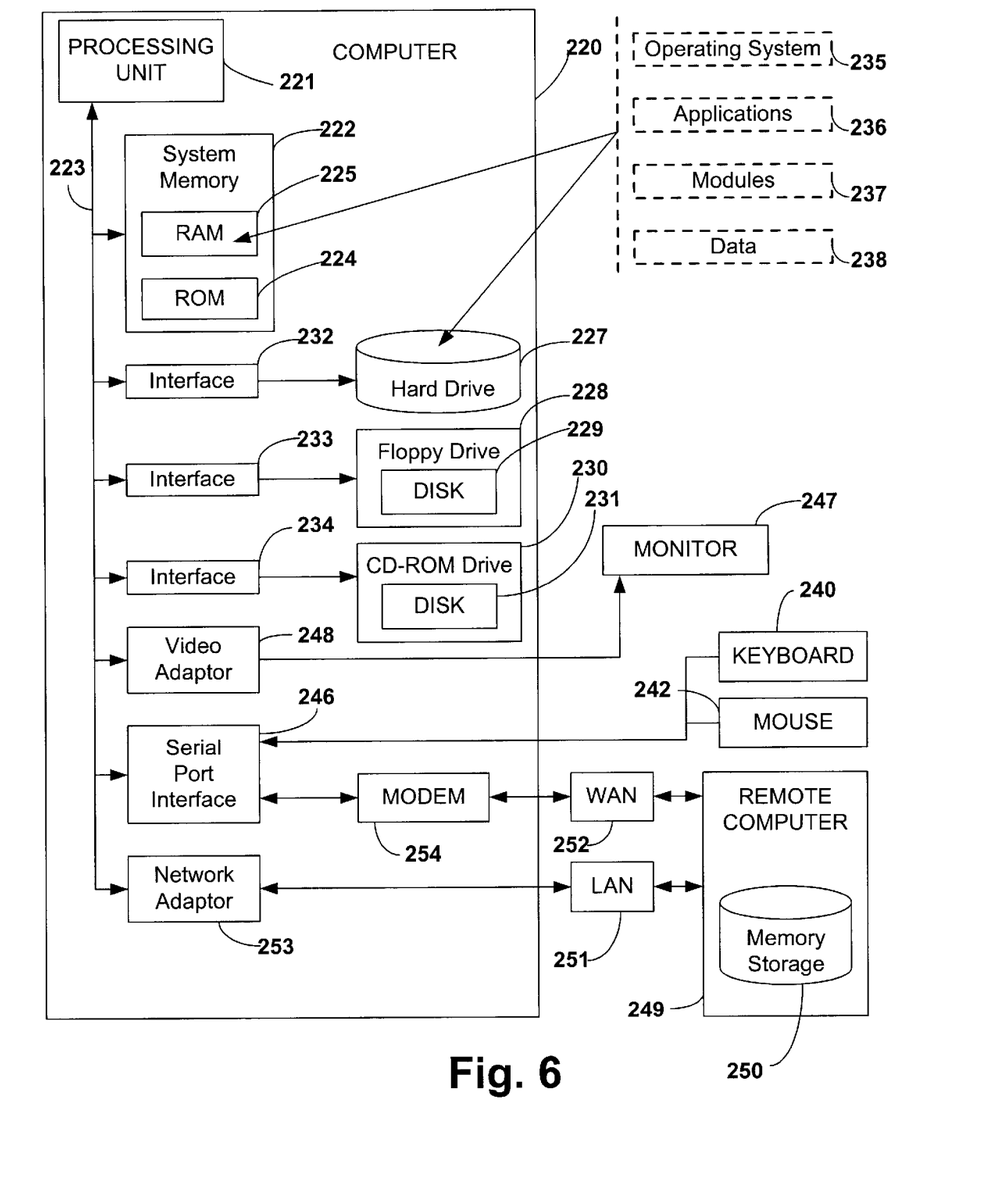
FIG. 6 is a schematic block diagram illustrating a suitable computing environment in accordance with an aspect of the present invention.

In order to provide a context for the various aspects of the invention, FIG. 6 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 6, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors, including but not limited to Intel x86, Pentium™ and compatible microprocessors from Intel and others, including Cyrix, AMD and Nexgen; Alpha™ from Digital; MIPS™ from MIPS Technology, NEC, IDT, Siemens, and others; and the PowerPC™ from IBM and Motorola. Dual microprocessors and other multi-processor architectures also can be used as the processing unit 221. Dual microprocessors and other multi-processor architectures also may be employed as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft® operating system (e.g., Windows® NT operating system). It is to be appreciated that other operating systems may be employed such as UNIX, LINUX, for example.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 6. The logical connections depicted in FIG. 6 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for installing an N-bit operating system (OS), which includes an M-bit OS, comprising:
    a mapping subsystem for creating a file which includes components corresponding to the N-bit OS, and components corresponding to the M-bit OS; and
    an installation subsystem for installing the respective components so that either an N-bit or M-bit application can be executed.

2. The system of claim 1 wherein the mapping subsystem reads a singular list of files associated with the N-bit OS to create the M-bit OS.

3. The system of claim 2 wherein the singular list includes at least one of operating system files and system registry files.

4. The system of claim 1 wherein the singular list includes INX files.

5. The system of claim 2 further comprising a preprocessing system for reading the singular list and providing N-bit installation directives.

6. The system of claim 5 wherein the preprocessing system generates INF files associated with the N-bit operating system.

7. The system of claim 5 further comprising a filter for reading files from the preprocessing system and generating a list of M-bit installation directives.

8. The system of claim 7 wherein the filter appends a character to the M-bit installation directives in order to distinguish from N-bit installation directives.

9. The system of claim 7 wherein the filter generates a list of build directives associated with the N-bit and M-bit operating systems.

10. The system of claim 9 further comprising a build system for utilizing the build directives to generate N-bit and M-bit binary directories.

11. The system of claim 10 wherein the build system further comprises compilers, linkers, and formatters to generate an N-bit binary file and an M-bit binary file.

12. The system of claim 11 further comprising a storage media to store the N-bit and M-bit binary directories.

13. The system of claim 12 further comprising an install file that utilizes the installation directives to install the contents of the N-bit and M-bit binary directories.

14. The system of claim 13 wherein the install file removes a letter appended to the M-bit binary files.

15. A method for generating a list of installation components for two or more operating systems, the method comprising:
    obtaining a first list of components corresponding to a first operating system;
    processing the first list of components to identify one or more components corresponding to a second operating system; and
    generating a second list of components corresponding to the first and second operating systems.

16. The method of claim 15, wherein the first operating system is an N-bit operating system and the second operating system is an M-bit operating system.

17. The method of claim 15, further comprising:
    installing the respective components so that either an N-bit or M-bit application can be executed.

18. The method of claim 16, further comprising:
    storing the N-bit components and M-bit components on a storage media such that the respective components are isolated.

19. A computer-readable medium having computer-executable instructions for performing the method of claim 15.

20. The method of claim 17, further comprising:
    generating an M-bit installation list from an N-bit installation list.

21. The method of claim 20, further comprising:
    generating an M-bit build list from an N-bit installation list.

22. The method of claim 20 further comprising:
    generating an N-bit build list from an N-bit installation list.

23. The method of claim 17 fixer comprising:
    building N-bit and M-bit binaries from a singular list of a plurality of build directives.

24. The method of claim 23 further comprising:
    copying the N-bit and M-bit binaries to release subdirectories.

25. The method of claim 24 further comprising:
    appending a character onto the file names associated with the M-bit binaries.

26. The method of claim 25 further comprising:
    copying the release subdirectories onto the storage media.

27. A system for generating a list of installation components for two or more operating systems, comprising:
    means for obtaining a first list of components corresponding to a first operating system;
    means for processing the first of components to identify one or more components corresponding to a second operating system; and
    means for generating a second list of components corresponding to the first and second operating systems.

28. The system of claim 27, wherein the first operating system is an N-bit operating system and the second operating system is an M-bit operating system.

29. The system of claim 28 further comprising:
    means for generating an M-bit installation list from an N-bit installation list.

30. The system of claim 28 further comprising:
    means for generating an M-bit build list from an N-bit installation list.

* * * * *